United States Patent [19]

Kunii

[11] Patent Number: 5,754,326
[45] Date of Patent: May 19, 1998

[54] OPTICAL DEFLECTOR

[75] Inventor: Yoshimasa Kunii, Saitama, Japan

[73] Assignee: Fuji Xerox Co., Ltd., Tokyo, Japan

[21] Appl. No.: 125,208

[22] Filed: Sep. 23, 1993

[30] Foreign Application Priority Data

Sep. 25, 1992 [JP] Japan ................. 4-256503

[51] Int. Cl.$^6$ ................. G02B 26/08
[52] U.S. Cl. ................. 359/198; 359/200
[58] Field of Search ................. 359/198, 200, 359/216, 217, 218, 219

[56] References Cited

U.S. PATENT DOCUMENTS

| | | | |
|---|---|---|---|
| 4,523,800 | 6/1985 | Yamashita | 359/216 |
| 4,607,908 | 8/1986 | Ishida | 359/216 |
| 4,717,223 | 1/1988 | Ishida | 359/200 |
| 5,069,515 | 12/1991 | Itami | 359/216 |
| 5,142,176 | 8/1992 | Takahashi | 310/90.5 |

FOREIGN PATENT DOCUMENTS

| | | | |
|---|---|---|---|
| 59-123824 | 8/1984 | Japan . | |
| 9197010 | 11/1984 | Japan | 359/200 |
| 62-94814 | 1/1987 | Japan . | |
| 64-18119 | 1/1989 | Japan . | |
| 64-66615 | 3/1989 | Japan . | |
| 1154115 | 6/1989 | Japan . | |
| 3105815 | 11/1991 | Japan . | |
| 4-204625 | 7/1992 | Japan | 359/198 |

*Primary Examiner*—Paul M. Dzierzynski
*Assistant Examiner*—Darren E. Schuberg
*Attorney, Agent, or Firm*—Finnegan, Henderson, Farabow, Garrett & Dunner, L.L.P.

[57] ABSTRACT

The improved optical deflector includes a polygonal mirror to be rotated for deflecting an incident light beam for scanning purposes and a motor for rotating the polygonal mirror, and the rotating shaft of the motor is provided with a reference seat on which the polygonal mirror is to be mounted in close contact; the rotor of the motor is solely composed of a rotor magnet that is mounted on the rotating shaft, with the polygonal mirror being disposed between the reference seat of the rotating shaft and the rotor magnet; the rotor magnet is held in close contact with a plane of the polygonal mirror which is perpendicular to the rotating center axis thereof. Even if the optical deflecting element such as a polygonal mirror is rotated at high speed, the runout of the rotor of the motor is suppressed to a minimum without causing a deviation of the scanning light beam, thereby insuring efficient rotation of the deflecting element. The optical deflector consists of a sufficiently small number of parts or components to permit easy working and assembling operations.

3 Claims, 5 Drawing Sheets

OPTICAL DEFLECTOR

BACKGROUND OF THE INVENTION

The present invention relates to an optical deflector for use with laser printers, digital copiers, laser facsimiles, POS or the like. More particularly, the present invention relates to an optical deflector that performs scanning with a beam of incident light by means of a rotating element such as a polygonal mirror or a hologram disk.

FIG. 5 shows a common optical scanner 1. A light beam 8 emitting from a light source such as a semiconductor laser (not shown) arrives at a rotating polygonal mirror 11 in an optical deflector 10, whereupon the beam is deflected by the rotating mirror 11 to pass through imaging lens optics 6 for producing a desired scan image on a subject 9 to be scanned. The beam further passes through a dustproof glass window 7 to reach the subject 9, thereby forming an electrophotographic electrostatic latent image or perform exposure on a film.

The optical deflector 10 usually rotates the polygonal mirror 11 by means of a dc brushless motor which is screwed to an optical box 2. The whole part of the optical scanner 1 is made dustproof by means of a cover 5.

FIG. 6 shows an example of the conventional optical deflector (i.e., Unexamined Japanese Patent Publications Nos. 18119/1989 and 66615/1989). As shown, a stationary shaft 15 is secured to a motor body 99 by means of a screw 16 and both a stator coil 31 and an annular stator yoke 32 that is made of either a ferrous metal (e.g., silicon steel) or ferrite are secured to the motor body 99 by means of a screw or adhesive.

When the stator coil 31 is supplied with a current from a control circuit 35, a magnetic field is created both above and below the coil. The stator yoke 32 works to reorient the downward magnetic field to be directed upward in order to improve the efficiency of motor operation.

The rotating parts of the motor provide two ball bearings 19 and 19a that are fitted into a rotating shaft 20 which is surrounded by the polygonal mirror 11, a spring 23, a rotor yoke 25 and a rotor magnet 30, all of which are secured by means of a ring 29.

The rotor magnet 30 is bonded to the rotor yoke 25. The position of the ring 29 is properly set by a groove 95 provided on the rotating shaft 20, so that the compressive force of the spring 23 urges the polygonal mirror 11 against a reference seat 21 provided at an end of the rotating shaft 20.

The rotor yoke 25 is provided with a balance groove 26 for dynamic balance adjustment and a balancing weight 27 of an appropriate mass is fitted into the balance groove in an appropriate position.

A ring 17 is secured to the stationary shaft 15 in such a position that a pressurizing spring 18 applies a "preload", or a force that depresses the inner race of the bearing 19 downward and the inner race of the bearing 19a upward.

A seal 24 is fastened to the top end of the rotating shaft 20 by means of an adhesive or a tackifier, so that the grease in the bearing 19 is prevented from splashing out of the optical deflector.

The rotor yoke 25 shown in FIG. 6 has the same function as the stator yoke 32. Stated more specifically, the rotor magnet 30 shown in FIG. 6 creates a magnetic field both above and below. The rotor yoke 25 work to reorient the upward magnetic field to be directed downward so as to improve the efficiency of motor operation.

However, since the rotor yoke 25 is also made of a ferrous metal or ferrite, the moment of inertia of the rotor yoke 25 becomes a very large value because of the specific gravity of the constituent material (ferrous metals have specific gravities of about 7.8) and the yokels shape (it has a greater dimension in the radial direction than in the direction of thickness).

The problem is solved in such a manner that the rotor is solely composed of a rotor magnet 40 by eliminating the rotor yoke from the rotating parts of the dc brushless motor as shown in FIG. 7. The rotor magnet 40 is molded of a plastic material and has a specific gravity of about 3.5. Therefore, the rotor shown in FIG. 7 has a far smaller moment of inertia than that of the conventional optical deflector shown in FIG. 6.

As apparently described above, the rotor yoke is provided with a view to improving the efficiency of motor operation by causing magnetic fields to act effectively, so that the moment of inertia of the rotor is increased, thereby reducing rather than increasing the rotating efficiency of the motor.

As a matter of fact, the design shown in FIG. 7 is proved to decrease a drive current than the design shown in FIG. 6 as indicated in Table 1 set forth in bellow.

TABLE 1

| Parameter | FIG. 6 | FIG. 7 |
| --- | --- | --- |
| No. of faces of polygonal mirror | 6 | 6 |
| Distance between opposing faces of polygonal mirror, mm | 40 | 40 |
| Average thickness of polygonal mirror, mm | 6 | 6 |
| Outside diameter of magnet, mm | 48φ | 50φ |
| Average thickness of magnet, mm | 4 | 5 |
| Outside diameter of rotor yoke, mm | 50φ | — |
| Average thickness of rotor yoke, mm | 1 | — |
| Rotational speed, rpm | 15,000 | 15,000 |
| DC Voltage, V | 24 | 24 |
| Drive current, A | 1.1 | 0.8 |

However, the design shown in FIG. 7 which eliminates the rotor yoke to compose the rotor solely of the rotor magnet 40 causes the other problem. The precision with which the rotor magnet 40 can be mounted perpendicularly to the rotating center axis, namely, the "runout precision" of rotor magnet 40 with respect to the rotating center axis, is determined by the precision of the inside diameter of rotor magnet 40, the precision of the outside diameter of rotating shaft 20, the orthogonality of the ring 29 with respect to the rotating center axis, and the orthogonality of the magnet 40 with respect to the rotating center axis. The most predominant factor that governs the orthogonality is the "length of fit" between the inside diameter of the magnet 40 and the outside diameter of the rotating shaft 20. In the cases shown in Table. 1, the length of fit is equal to the average thickness of magnet 40 (5 mm) but this is too short to assure a satisfactory value of the "runout precision". The idea of increasing the length of fit in order to satisfy the need for high runout precision has been difficult to adopt since it is not favored by the purpose of constructing a "thin motor".

Consider the case where the rotor magnet 40 is mounted as shown in FIG. 8 at an angle that is tolerated by the lower limit of permissible precision range; it has been verified experimentally that when the magnet rotates at high speed, it wobbles up and down so extensively that not only the optical deflector but also the optical scanner containing the same is vibrated as shown in FIG. 9.

If a balancing weight 43 is fitted in a balance groove 41 on the rotor magnet 40 and dynamic balance adjustment is effected, the vibration in the X-Y plane (see FIG. 9) can be suppressed but it is difficult to suppress effectively the vibration in the vertical or Z direction. The vertical vibration is due to the force couple (bending moment) caused by the rotation of the magnet 40 mounted at an angle and it eventually causes the beam 8 shown in FIG. 5 to deviate from a predetermined position on the subject 9 to be scanned.

This is also true of the conventional optical deflector shown in FIG. 6 and if the magnet 40 shown in FIG. 7 is replaced by the rotor yoke 25 shown in FIG. 6, the same explanation is applied except that there is an additional factor that must be considered, i.e., the orthogonality of the interface between the bonded rotor yoke 25 and magnet 30 with respect to the rotating center axis as shown in FIG. 6.

SUMMARY OF THE INVENTION

The present invention has been accomplished under these circumstances and has an object providing an optical deflector that is characterized in that even if an optical deflecting element such as a polygonal mirror or a hologram disk that deflects an incident light beam for scanning purposes is rotated at high speed, the runout of the rotor of a motor is suppressed to a minimum without causing a deviation of the scanning light beam, thereby insuring efficient rotation of those deflecting elements and which is also characterized in that it consists of a sufficiently small number of parts or components to permit easy working and assembling operations.

The object of the present invention can be attained by an optical deflector that comprises an optical deflecting element to be rotated for deflecting an incident light beam for scanning purposes and a motor for rotating said optical deflecting element, the rotating shaft of the motor being provided with a reference seat on which the optical deflecting element is to be mounted in close contact, which deflector is characterized in that the rotor of said motor is solely composed of a rotor magnet that is mounted on said rotating shaft, with said optical deflecting element being disposed between the reference seat of said rotating shaft and said rotor magnet, and that said rotor magnet is held in close contact with a plane of said optical deflecting element that is perpendicular to the rotating center axis thereof.

In a preferred embodiment, the rotor magnet may be secured adhesively to the rotating shaft. In another preferred embodiment, the optical deflecting element may be secured compressively to the reference seat of the rotating shaft, with the rotor magnet being interposed, by means of an elastic member.

In the optical deflector of the present invention, the optical deflecting element is disposed between the reference seat of the rotating shaft of the motor and the rotor magnet whereas the rotor magnet is held in close contact with a plane of the optical deflecting element that is perpendicular to the rotating center axis thereof. Because of this design feature, the optical deflecting element can be rotated at high speed and yet the runout of the rotor suppressed to a minimum without causing a deviation of the scanning light beam. Hence, the optical deflector can be operated with high precision. In addition, the rotor of the motor is composed solely of the rotor magnet which is mounted on the rotating shaft; hence, the moment of inertia of the rotor can be made small enough to improve the rotating efficiency of the motor. As a further advantage, the elimination of the imbalanced part of the rotor contributes ease in performing the step of dynamic balance adjustment.

These features combine to reduce the total number of parts or components and the construction of the optical deflector is sufficiently simplified to permit easy working, assembling and adjusting operations, which eventually results in a lower manufacturing cost.

BRIEF DESCRIPTION OF THE DRAWINGS

In the accompanying drawings:

FIG. 4(*b*) is a plan view of the leaf spring used in that rotating element;

FIG. 4(*c*) is an enlarged view of a portion of FIG. 4(*a*);

DESCRIPTION OF THE PREFERRED EMBODIMENTS

The optical deflector of the present invention is described below with reference to several preferred embodiments. The construction of the optical deflector is shown schematically in FIG. 1. It has the polygonal mirror 11 positioned between the reference seat 21 of the rotating shaft 20 and the rotor magnet 40 and the most important design feature thereof is that the rotor magnet 40 is held in close contact with a plane of the polygonal mirror 11 that is perpendicular to the rotating center axis thereof. In accordance with this feature, the runout of the rotor magnet 40 is suppressed to a minimum, thereby reducing the vibration of not only the optical deflector but also the optical scanner containing the same. In addition, the rotor is solely composed of the rotor magnet 40, so that not only is the moment of inertia of the rotor sufficiently reduced to improve the rotating efficiency of the motor but the number of parts or components is also reduced to simplify the overall construction and permit easy working and assembling operations.

Figure 1:
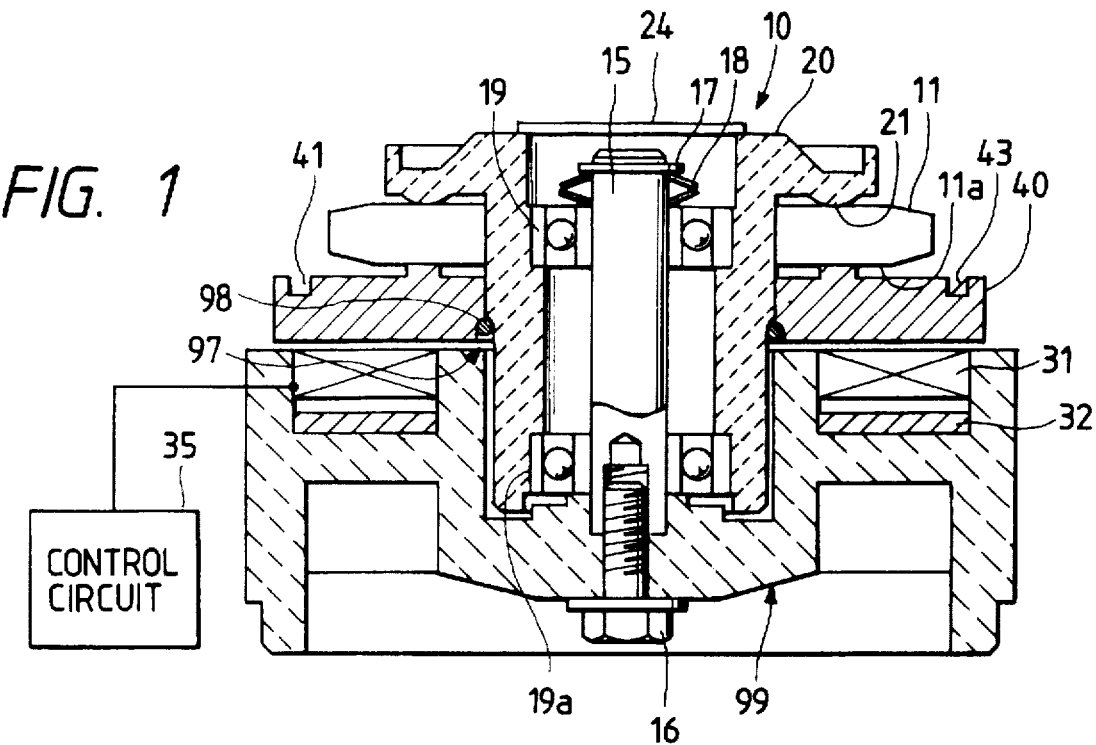
FIG. 1 is a sectional view showing schematically an optical deflector according to a first embodiment of the present invention.
Figure 6:
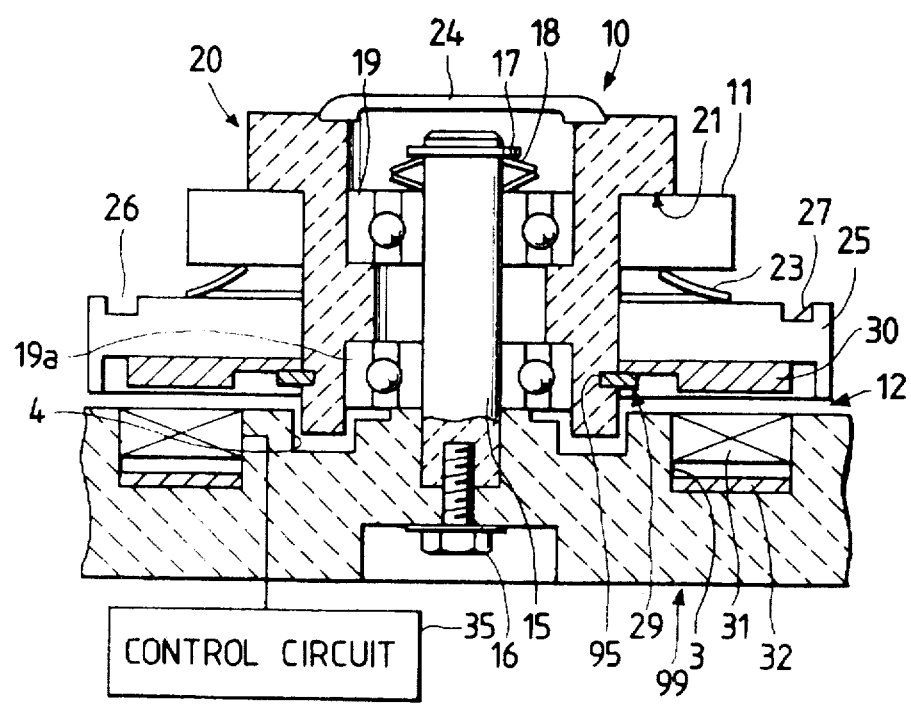
FIG. 6 is a sectional view showing schematically a conventional optical deflector.
Figure 7:
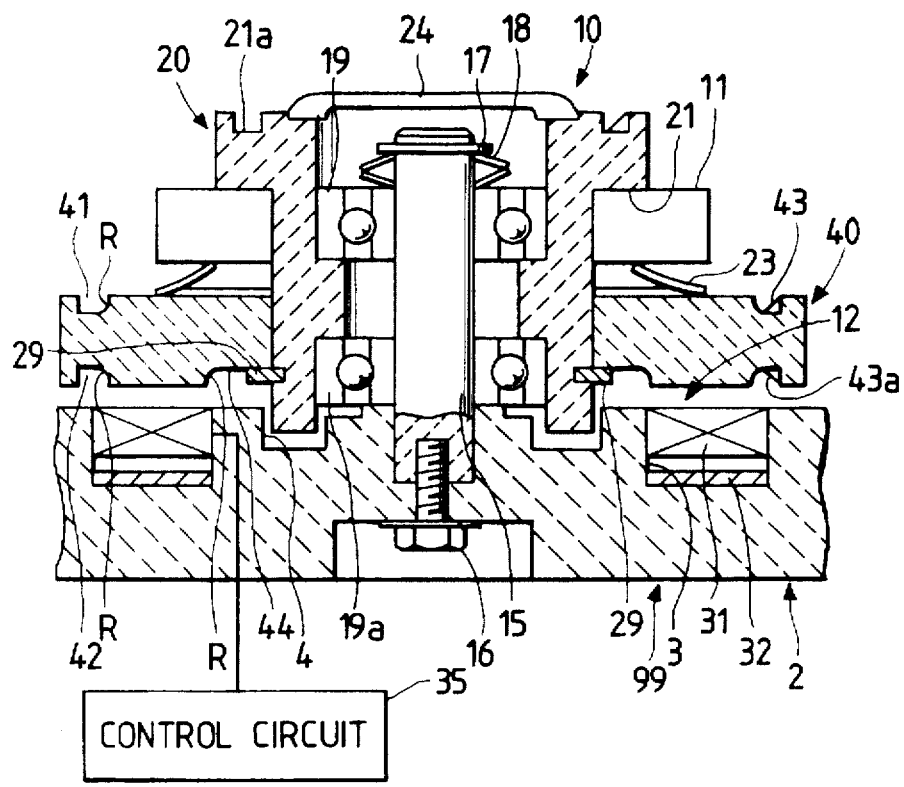
FIG. 7 is a sectional view showing schematically another conventional optical deflector.
Figure 8:
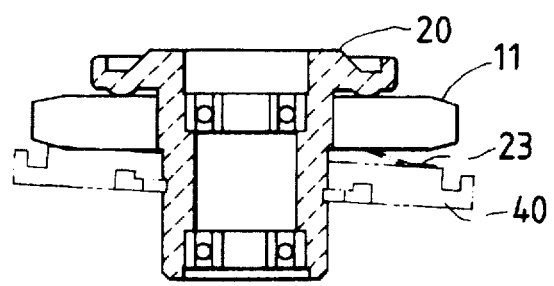
FIG. 8 is a diagram showing how the rotating element in FIG. 7 is mounted in the optical deflector within a permissible range of positional precision.

The embodiment shown in FIG. 1 is first described below. The basic construction and functions of the embodiment are identical to those of the conventional optical deflectors as shown in FIGS. 6 and 7. Stated briefly, a stationary shaft 15 is secured to a motor body 99 by means of a screw 16 and both a stator coil 31 and an annular stator yoke 32 that is made of a ferrous metal (e.g., silicon steel) or ferrite are secured to the motor body 99 by means of a screw or adhesive.

When the stator coil 31 is supplied with a current from a control circuit 35, a magnetic field is created both above and below the coil. To improve the efficiency of motor operation, the stator yoke 32 works to reorient the downward magnetic field to be directed upward.

The rotating parts of the motor comprise two ball bearings 19 and 19a that are fitted into a rotating shaft 20. The arrangement of the parts surrounding the rotating shaft 20 is different from the way that is shown in FIGS. 6 and 7. The polygonal mirror 11 is held in close contact with the reference seat 21 of the shaft 20 and, in addition, the rotor magnet 40 is held in close contact with a plane 11a of the polygonal mirror 11 that is perpendicular to the rotating center axis thereof. The polygonal mirror 11, the rotating shaft 20 and the rotor magnet 40 are formed in an integral assembly by being secured with an adhesive 97 filled in a V groove on the rotating shaft 20. This is the most important aspect of the present invention and will be elaborated upon later.

The rotor magnet 40 is provided with a balance groove 41 for dynamic balance adjustment and a balancing weight 43 of an appropriate mass is fitted in the balance groove 41 in an appropriate position.

A ring 17 is secured to the stationary shaft 15 in such a position that a pressurizing spring 18 applies a "preload", or a force that depresses the inner race of the beating 19 downward and the inner race of the bearing 19a upward.

A seal 24 is fastened to the top end of the rotating shaft 20 by means of an adhesive or a tackifier so that the grease in the bearing 19 is prevented from splashing out of the optical deflector.

As described above, the first important feature of the present invention is that the rotor of the motor has no yoke but that it is composed solely of the rotor magnet 40. A plastic magnet of small specific gravity is used as the rotor magnet. The use of the plastic magnet reduces the necessary drive current, thereby contributing to an improvement in the rotating efficiency of the motor (see Table 1, supra). The elimination of the rotor yoke offers another advantage in that the number of parts or components is sufficiently reduced to simplify the overall construction of the optical deflector while permitting easy working and assembling operations. This is one of the most important aspects of the present invention.

Figure 2:
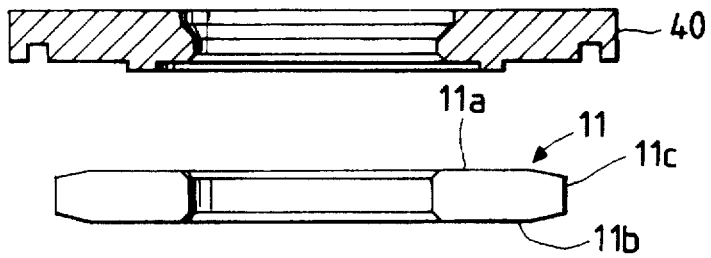
FIG. 2 is an exploded view of the rotating element of the optical deflector shown in FIG. 1.
Figure 2:
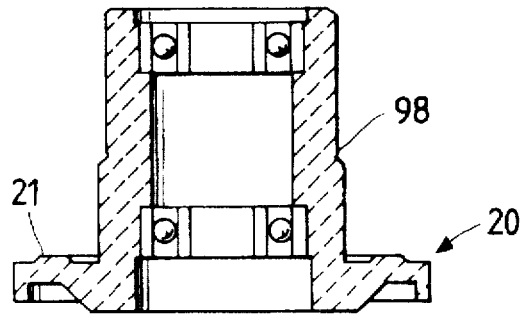
Figure 9:
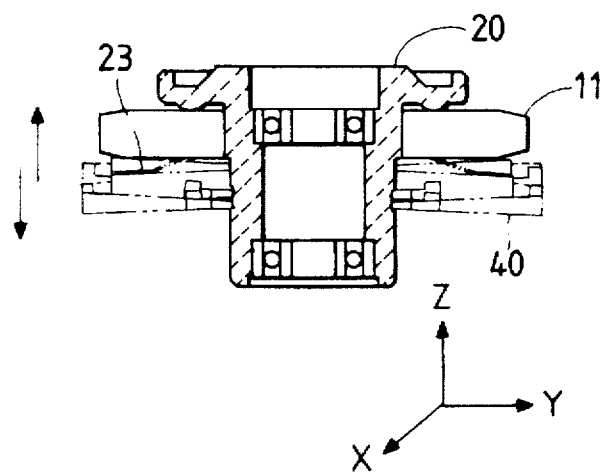
FIG. 9 is a diagram illustrating how the rotating element in FIG. 7 vibrates as it rotates at high speed.

The other important feature of the optical deflector of the present invention is that the rotor magnet 40 is held in close contact with the plane 11a of the polygonal mirror 11 which is perpendicular to the rotating center axis thereof. This point is further described with reference to FIG. 2 which is an exploded view of the rotating element of the optical deflector. The polygonal mirror 11 and the rotor magnet 40 are slipped over the rotating shaft 20 in that order, and a reference plane 11b of the polygonal mirror 11 is urged against the reference seat 21 of the rotating shaft 20 until it comes in close contact with the latter whereas the rotor magnet 40 is urged against another reference plane 11a of the polygonal mirror 11 until it comes in close contact with the latter; then, an adhesive 97 (see FIG. 1) is applied or filled in a V groove 98 formed between the rotating shaft 20 and the rotor magnet 40 and, thereafter, the three members are secured one to another. The adhesive 97 is advantageously either a common rapid-cure adhesive agent or a uv curable anaerobic adhesive agent. To insure precise working of the reflecting faces 11c which are the most important surfaces of the polygonal mirror 11, the flatness of the reference plane 11a relative to the other reference plane 11b, as well as the orthogonality of these planes with respect to the rotating center axis of the polygonal mirror 11 are almost comparable in precision to the reflecting faces 11c (to a precision on the order of the wavelength of light). Therefore, by bringing the rotor magnet 40 into abutment against the reference plane 11a of the polygonal mirror 11, the runout of the rotor magnet 40 which has been described with reference to FIG. 9 can be minimized so as to damp the vibration of the optical deflector and, hence, the optical scanner containing it.

The above-described method of securing the polygonal mirror 11, the rotating shaft 20 and the rotor magnet 40 is reasonably effective if the rotating element of the optical deflector rotates at no faster than 10,000 rpm under the operating conditions shown in Table 1. However, if the rotational speed of the rotating element exceeds 10,000 rpm, the polygonal mirror 11 may occasionally experience rotational slip with respect to the rotating shaft 20. Even if the rotational speed is below 10,000 rpm, such rotational slip can occur if the distance between opposing faces of the polygonal mirror 11 exceeds 40 mm or if the rotating element is wholly heated or cooled to develop thermal expansion mismatches between the respective parts of the rotating element, whereby small gaps occur in a direction parallel to the rotating center axis of the polygonal mirror. To prevent this phenomenon of rotational slip, the polygonal mirror 11 and the rotating shaft 20 can be fix securely by filling the gap between them with a solution containing a fine particulate matter, resin material and a solvent.

Figure 3:
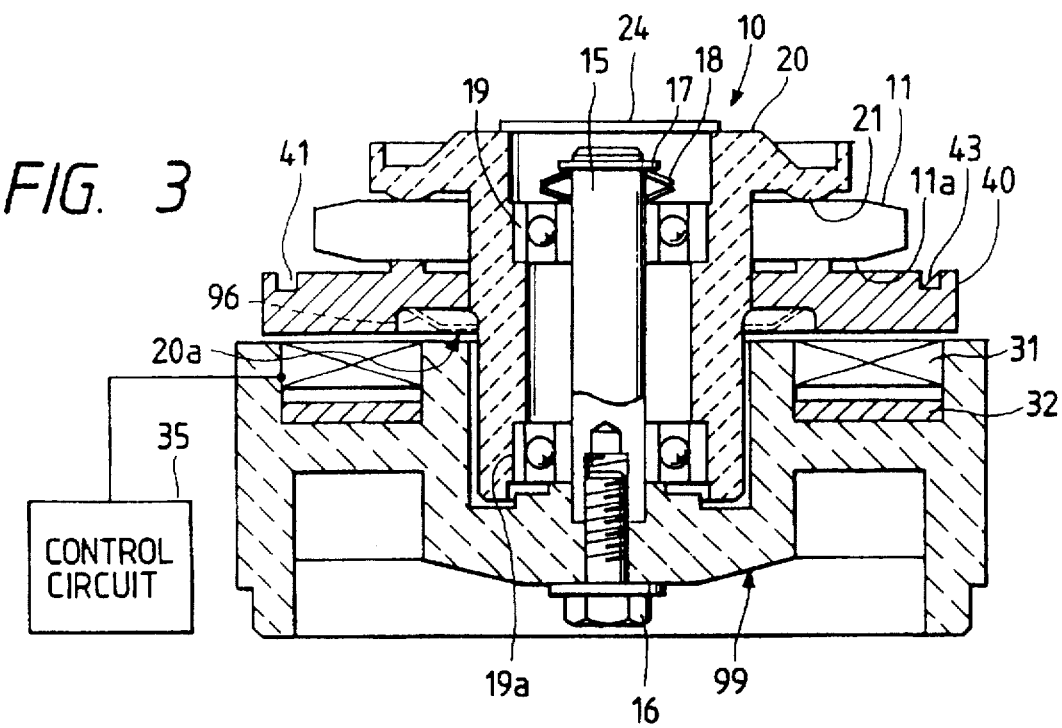
FIG. 3 is a sectional view showing schematically an optical deflector according to another embodiment of the present invention.
Figure 4A:
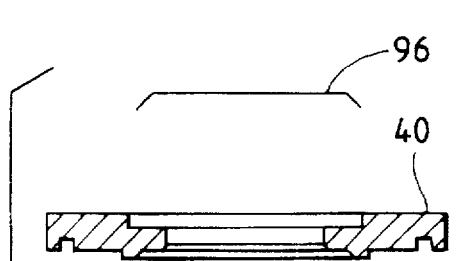
FIG. 4(*a*) is an exploded view of the rotating element of the optical deflector in FIG. 3
Figure 4B:
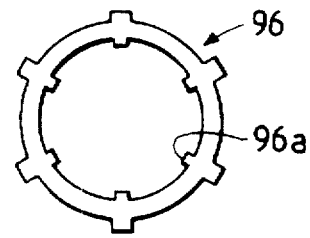
Figure 4C:
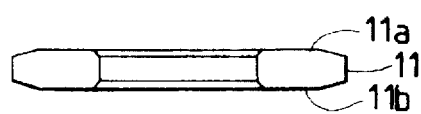
Figure 4C:
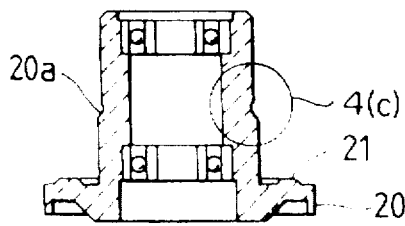
Figure 4C:
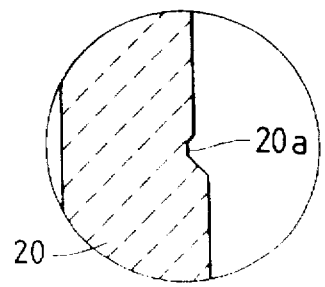
Figure 5:
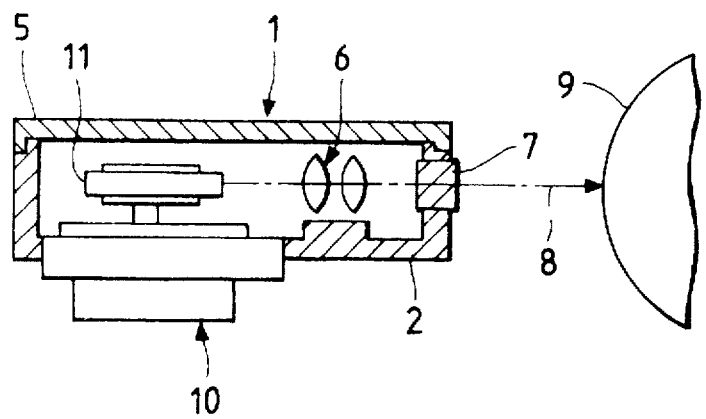
FIG. 5 is a sectional view showing schematically a common optical scanner.

An optical deflector according to another embodiment of the present invention is next described below with reference to FIGS. 3, 4(a), 4(b) and 4(c). FIG. 3 is a sectional view showing diagrammatically the construction of the optical deflector. FIG. 4(a) is an exploded view of the rotating element of the deflector and FIG. 4(b) is a plane view of the leaf spring in the rotating element. The only difference between the second embodiment and the embodiment shown in FIG. 1 concerns the method of securing the rotor magnet 40 to the polygonal mirror 11 which is compressed into close contact with the reference seat 21 of the rotating shaft 20. Stated more specifically, the polygonal mirror 11 and the rotor magnet 40 are slipped over the rotating shaft 20 in the order written and the reference plane 11b of the polygonal mirror 11 is pressed into close contact with the reference seat 21 of the rotating shaft 20 whereas the rotor magnet 40 is pressed into close contact with the other reference plane 11a of the polygonal mirror 11; finally, a leaf spring 96 of such a shape as shown in FIG. 4(b) is fitted over the rotating shaft 20 so that it depresses the polygonal mirror 11 and the rotor magnet 40 to be fixed in position. The leaf spring 96 is of an annular shape and has on the inner circumference thereof a plurality of fingers 96a that will engage grooves 20a provided on the outer circumference of the rotating shaft 20. In the case shown in FIG. 3, the grooves 20a on the rotating shaft 20 are located in such positions that the leaf spring 96 will produce a sufficient force to compress the polygonal mirror 11 against the reference seat 21 of the rotating shaft 20, with the rotor magnet 40 being interposed.

The fixing method described above is effective in preventing the phenomenon of rotational slip due to the small gaps that develop between the individual parts of the rotating element along the rotating center axis on account of thermal expansion mismatches and, hence, there is no need to fill the gap between the polygonal mirror 11 and the rotating shaft 20 with a solution containing a fine particulate matter, a resin material and a solvent. It should, however, be noted that notwithstanding this fixing method, the phenomenon of rotational slip can occur if the rotating element revolves at a very high speed; therefore, if the polygonal mirror 11 has a large diameter, a solution containing a fine particulate matter, a resin material and a solvent must be injected into the gap between the polygonal mirror 11 and the rotating shaft 20 so as to fix them in position as in the case shown in FIG. 1.

While two embodiments of the present invention have been described above, it should be understood that the present invention is in no way limited to these embodiments only and that various modifications can be made without departing from the spirit and scope of the present invention. For instance, the leaf spring used to compress the polygonal mirror and the rotor magnet against the rotating shaft so that they are fixed in position may be replaced by common O rings and various other known types of elastic members. The foregoing description assumes the use of a polygonal mirror as an optical deflecting element that rotates to deflect an incident light beam for scanning purposes. It should, however, be noted that the polygonal mirror may be replaced not only by a hologram disk that refracts an incident light beam for deflection but also by a prism, etc.

As will be understood from the foregoing description, the optical deflector of the present invention is such that the optical deflecting element is disposed between the reference seat of the rotating shaft of the motor and the rotor magnet whereas the rotor magnet is held in close contact with a plane of the optical deflecting element that is perpendicular to the rotating center axis thereof. Because of this design feature, the optical deflecting element can be rotated at high speed and yet the runout of the rotor is suppressed to a minimum without causing a deviation of the scanning light beam. Hence, the optical deflector can be operated with high precision. In addition, the rotor of the motor is composed solely of the rotor magnet which is mounted on the rotating shaft; hence, the moment of inertia of the rotor can be made small enough to improve the rotating efficiency of the motor. As a further advantage, the elimination of the imbalanced part of the rotor contributes ease in performing the step of dynamic balance adjustment.

These features combine to reduce the total number of parts or components and the construction of the optical deflector is sufficiently simplified to permit easy working, assembling and adjusting operations, which eventually results in a lower manufacturing cost.

What is claimed is:

1. An optical deflector for deflecting an incident light beam for scanning a subject rotatively, comprising:

an optical deflecting element for deflecting an incident light beam; and a motor for rotating said optical deflecting element, said motor comprising:

a rotating shaft having a reference seat for mounting said optical deflecting element in direct contact with said rotating shaft; and a rotor magnet mounted on said rotating shaft, wherein said optical deflecting element is disposed between said reference seat of said rotating shaft and said rotor magnet, and said motor magnet is held in direct contact with a plane surface of said optical deflecting element that is perpendicular to a rotating center axis thereof; and wherein said optical defecting element is secured compressively to said reference seat of said rotating shaft by an elastic member and said rotor magnet is interposed between the elastic member and the optical deflecting element.

2. The optical deflector according to claim 1, wherein said optical deflecting element comprises a polygonal mirror.

3. The optical deflector according to claim 1, wherein said motor further comprises a motor body, a stationary shaft secured to said motor body, a stator coil secured to said motor body, and an annular stator yoke secured to said motor body.

* * * * *

UNITED STATES PATENT AND TRADEMARK OFFICE
CERTIFICATE OF CORRECTION

PATENT NO. : 5,754,326
DATED : May 19, 1998
INVENTOR(S) : Kunll

It is certified that error appears in the above-identified patent and that said Letters Patent is hereby corrected as shown below:

Claim 1, column 8, line 24, "defecting" should read --deflecting--.

Signed and Sealed this

First Day of June, 1999

Attest:

Attesting Officer

Q. TODD DICKINSON

Acting Commissioner of Patents and Trademarks